June 3, 1952

F. WALLER ET AL 2,598,731

DIAPHRAGM CONTROL FOR MULTILENS CAMERAS

Filed Oct. 9, 1948

INVENTORS
Fred Waller
Richard C. Babish
BY Emery Varney,
Whittemore & Dix
ATTORNEY June 3, 1952     F. WALLER ET AL     2,598,731
DIAPHRAGM CONTROL FOR MULTILENS CAMERAS
Filed Oct. 9, 1948     2 SHEETS—SHEET 2

INVENTORS
Fred Waller
Richard C. Babish
BY Emery Varney,
Whittemore & Dix
ATTORNEYS Patented June 3, 1952

2,598,731

UNITED STATES PATENT OFFICE 2,598,731

DIAPHRAGM CONTROL FOR MULTILENS CAMERAS

Fred Waller and Richard C. Babish, Huntington, N. Y., assignors to The Vitarama Corporation, Huntington Station, N. Y., a corporation of New York Application October 9, 1948, Serial No. 53,733

8 Claims. (Cl. 95—18)

This invention relates to diaphragm controls for lenses, especially the lenses of multi-camera structures of the type that are used for taking several pictures simultaneously and from different angles so that the pictures can be projected on a common screen to make a mosaic picture.

It is an object of the invention to provide an improved multi-camera structure in which lenses for taking mosaic pictures are located much closer together than previously with resulting reduction in the mismatching of the individual pictures when the latter are projected on a common screen to make the mosaic picture.

Another object of the invention is to provide improved apparatus for controlling the diaphragm opening of a lens, and the construction of the invention is such that the size of the lens mount for a given lens is greatly reduced as compared with lens mounts having diaphragm controls of the prior art. For certain sizes of lenses this invention make possible lens mounts having only one-half the width of previous mounts.

Some features of the invention relate to constructions for effecting simultaneous diaphragm control for a number of different movable lens mounts from a common diaphragm adjusting device at a fixed location. With this invention such control is obtained in spite of longitudinal movement of the individual lens mounts to change their focus, and in spite of transverse movements of the lens mounts to prevent parallax errors resulting from the focusing movement.

Other objects, features and advantages of the invention will appear or be pointed out as the description proceeds.

In the drawing, forming a part hereof in which like reference characters indicate corresponding parts in all the views, Figure 1 is a diagrammatic view showing three diaphragm controls of this invention connected with and operated by a common diaphragm adjusting device at a fixed location.

Figure 2:
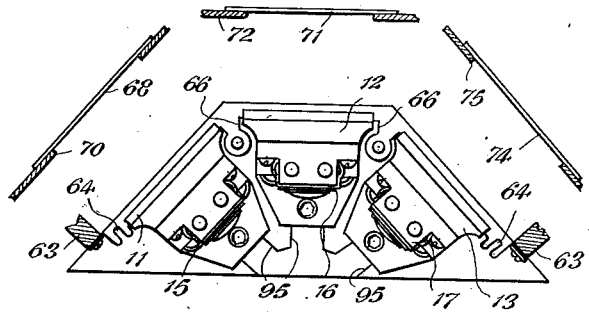
Figure 2 is a top plan view showing the actual relation of the lenses of Figure 1 when assembled in a multicamera structure for taking the individual pictures that are to be used to make a mosaic picture.

The structure shown in Figure 1 includes 3 lens supports 11, 12 and 13 that carry lens mounts 15, 16 and 17, respectively. Each of these lens supports is movable longitudinally, in a direction generally parallel to the optical axis of its lens, to change the focus of the lens. The two outside lens supports 11 and 13 are preferably movable transversely, at the same time that they move longitudinally, in order to prevent parallax errors that would result from the movement of the lenses to change their focus.

The lens support has two spaced blocks 21 and 22 connected to it in fixed relation with one another. These blocks 21 and 22 provide bearings for lead screws 24 and 25. There are threads on the lead screws between the bearing blocks 21 and 22, but the lead screws have end bearings that rotate in the bearing blocks 21 and 22.

A slide block 27 has threads that fit the lead screw 24 so that the slide block 27 moves lengthwise along the lead screw as a nut when the lead screw is rotated. The rearward face of the slide block 27 is flat and moves along the front face of the support 12. This flat face prevents the slide block 27 from turning with the lead screw.

A similar slide block 29 is threaded on the lead screw 25 and has a flat rearward face that moves along the front face of the support 12 to prevent the slide block 29 from turning with the lead screw 25. On the upper portions of the lead screws 24 and 25 there are meshing spur gears 31 and 32, respectively. Rotation of either of the lead screws 24 and 25 causes rotation of the other lead screw in the opposite direction as a result of their connection through the gears 31 and 32. Both of the lead screws 24 and 25 have the same kind of thread, that is, right hand or left hand, and the slide blocks 27 and 29, therefore, always move in opposite directions.

There is a diaphragm control plate 35 connected to the slide block 27 by screws 36; and another diaphragm control plate 38 is connected with the slide block 29 by screws 39. These diaphragm control plates 35 and 38 extend downwardly through a slot 40 (Fig. 3) in the lens mount 16 and into the space between the elements of the lens in the lens mount. There are similar openings 41 through both of the diaphragm control plates 35 and 38. When the slide blocks 27 and 29 are in one relation with one another, the diaphragm control plates 35 and 38 are so positioned that their openings 41 register and provide the maximum diaphragm opening for the lens.

As the lead screws 24 and 25 (Fig. 1) are rotated to cause the diaphragm control plates 35 and 38 to move in opposite directions, the openings 41 no longer register with one another and merely overlap to a greater or lesser degree depending upon the extent of movement of the plates 35 and 38 from their positions that provide the maximum diaphragm opening. Different shapes of openings 41 can be used, such as hexagonal or square openings, and the openings are preferably positioned so as to make one diagonal of the geometrical shape extend vertically. With such an orientation the diaphragm opening, when it becomes small, is limited to a central area of the lens.

Diaphragm control plates, similar to the plates 35 and 38 already described, and indicated by similar reference characters, are used with the lens mounts 15 and 17. These diaphragm control plates for the lens mounts 15 and 17 are operated by mechanism similar to that described for the lens mount 16, and are also indicated by the same reference characters.

The upper end of the lead screw 24 is connected by a flexible shaft 44 to a spur gear 45 that is supported by and rotatable on a frame 46 at a fixed location in the multi-camera structure. Two other spur gears 48, carried by the frame 46, mesh with the gear 45 and are connected by flexible shafts 50 to the lead screws 25 of the lens supports 11 and 13. The reason for connecting the flexible shafts 50 with the lead screws 25 while the flexible shaft 44 is connected with the lead screw 24 is to compensate for the fact that the flexible shafts 50 turn in the opposite direction from the shaft 44.

The gear 45 is secured to the lower end of a shaft 52. A spur gear 53 is secured to the shaft 52 at a higher level, and another spur gear 54 turns freely on the shaft 52. A knob 55 is attached to the upper end of the shaft 52 and is used to rotate the shaft for slow and accurate adjustment of the diaphragm openings. The gears 53 and 54 mesh with other spur gears 57 and 58, respectively. These other gears 57 and 58 are secured to a jack shaft 60 that turns in bearings not shown. When a rapid movement of the diaphragm controls is desired, a handle is applied to a non-circular upper end of the jack shaft 60 and such rotation of the shaft 60 is transmitted to the shaft 52 through the gears 57 and 53 which give the shaft 52 about three turns for each turn of the jack shaft 60.

Although the frame 46 and the gears carried by it are located at a fixed position, the lens supports 11, 12 and 13 are free to move both longitudinally and transversely without interfering with the adjustment of their diaphragm controls because the flexible shafts 44 and 50 impart the same rotation to the lead screws regardless of any longitudinal and transverse movement of the supports 11, 12 and 13 by which the lead screws are carried.

The lens supports 11, 12 and 13 are widely separated in Figure 1 for clearer illustration, and this diagrammatic illustration does not show the angular relation of the lens mounts 15, 16 and 17 with respect to one another. Figure 2 shows the actual positions of the lens supports 11, 12 and 13 and their associated lens mounts 15, 16 and 17 in the multi-camera structure. The outside lens supports 11 and 13 are connected on one side with walls 63 of the camera structure by flexible bellows 64. The sides of the center lens support 12 are connected with the adjacent sides of the lens supports 11 and 13 by flexible bellows 66.

The lens in the lens mount 15 exposes a film 68 at a film gate 70. The lens in the lens mount 16 exposes a film 71 at a film gate 72 and the lens in the lens mount 17 exposes a film 74 at a film gate 75. Partitions within the multi-camera structure are omitted for greater clearness in the drawing, and are well understood in the art.

Figure 3:
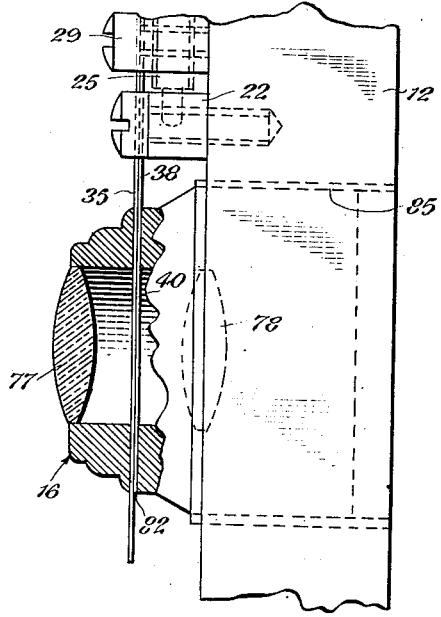
Figure 3 is an enlarged sectional view through one of the lens mounts of Figure 2.

Figure 3 shows the lens mount 16 with its lens elements 77 and 78. The diaphragm control plates 35 and 38 extend downwardly through the slot 40 in the lens mount, and these diaphragm control plates extend across the space between the lens elements 77 and 78 and then out through a slot 82 in the lower side of the lens mount 16.

Figure 4:
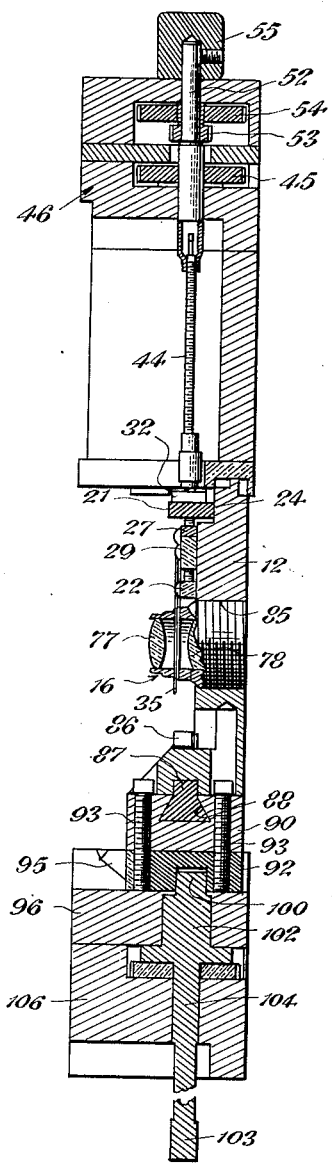
Figure 4 is a vertical, sectional view showing the actual structure of the control mechanism and one of the lens support assemblies that is illustrated diagrammatically in Figure 1.

Figure 4 shows the mechanical construction of the lens mount 16, and the construction of the other lens mounts is similar. The lens support 12 has a threaded opening 85 into which the lens mount 16 screws. The lower end of the lens support 12 is connected by a screw 86 to a gibbed slide 87 that slides in an undercut groove 88 in the top surface of a block 90. This sliding movement of the gibbed slide 87 in the groove 88 provides for transverse adjustment of the lens support 12, though ordinarily transverse movement is required only for the side lens supports. However, it is desirable to use a similar construction for all three lens supports in order to have uniformity in their manufacture.

The block 90 is connected with a gibbed slide 92 by screws 93, and this gibbed slide 92 fits into a dove-tailed groove or guideway 95 in the top surface of a base plate 96. There are three such guideways 95 converging toward the forward end of the base plate 96 as will be apparent from Figure 2. The slides 92 move along the grooves 95 to change the focus of the camera units.

The mechanism for focusing includes an eccentric 100 which extends into a slot in the underside of the gibbed slide 92. This eccentric 100 is attached to the upper end of a hub 102 which rotates in the base plate 96 as a bearing, and the hub 102 is rotated by a knob 103 at the lower end of a shaft 104 which extends through a frame 106 at the bottom of the camera structure.

Similar eccentrics move the other lens supports simultaneously and are geared to the shaft 104 by gearing that is similar to that used for affecting the simultaneous diaphragm control.

The preferred construction of the invention has been shown and described, but changes and modifications can be made and some features can be used without others, or in different combinations, without departing from the invention as defined in the claims.

What is claimed is:

1. A multi-camera structure including, in combination, a plurality of lens supports that support lenses with their axes and focal planes in angular relation to one another for taking mosaic pictures, mechanism for moving the lens supports along converging paths to focus the lenses on objects at different distances from the camera structure, a separate diaphragm control on each lens support, a common diaphragm adjusting device, separate motion transmitting connections leading from the common diaphragm adjusting device to each of the diaphragm controls on the lens supports; a rotary unit in said adjusting device, two manually actuated elements for rotating said unit, a direct connection between said unit and one of the manually actuated elements, and mechanism that connects said unit with the other of the manually actuated elements and that provides a mechanical advantage for effecting fine adjustment of said rotary unit of the common adjusting device.

2. A multi-camera structure for taking mosaic pictures, said structure including in combination, a base having converging guideways therein, lens supports movable along the guideways, mechanism for moving all of the lens supports along their guideways simultaneously for focusing the camera structure for objects at different distances, a lens mount carried by each of the lens supports, each lens mount comprising a sleeve enclosing spaced lens elements and having a slot extending through the upper and lower side of the sleeve at a region intermediate the lens elements, two overlapping plates extending through the slots in the upper and lower sides of each sleeve, said plates having overlapping openings with the center of the aperture provided by the overlapping openings located substantially on the optical axis of the lens, bearings carried by the lens supports above the lens mounts, extensions on opposite sides of the respective plates of each lens mount, a block connected with the extension of each plate, parallel lead screws threading through the blocks and supported at opposite ends by said bearings, a gear secured to each of lead screws and meshing with the gear of the other lead screw so that rotation of one lead screw causes rotation of the other in the opposite direction, a diaphragm adjusting device located on a fixed portion of the camera structure, and flexible shafting operably connecting the diaphragm adjusting device with one of the gears on each of the lens supports, and flexible shafting being constructed and arranged to transmit motion from the diaphragm adjusting device to the gears on the lens supports with the lens supports at any adjusted position lengthwise of the guideways along which said lens supports move to focus the camera structure or to correct for parallax errors.

3. In a camera a lens support, a diaphragm control comprising two overlapping plates, each having an opening therein, overlapping the opening in the other plate, a separate block connected with each plate, transversely spaced lead screws extending parallel to one another and threading through the respective blocks, gearing connecting the lead screws together for equal and simultaneous rotation in opposite directions, said gearing including a gear connected with each lead screw, and a diaphragm adjusting device connected with one of the gears for transmitting rotation to that gear and its lead screw and through that gear to the other gear and its connected lead screw to shift the plates in opposite directions and alter the degree of overlap of the openings through the plates while maintaining the region of the overlapping openings in a position along the axis of a lens carried by said support.

4. A multi-camera structure for taking pictures that are to be projected for making a mosaic picture, said structure including a plurality of lens mounts that support lenses with their axes and focal planes in angular relation to one another, forwardly converging guideways connected with a relatively fixed part of the camera structure and on which the lens mounts are movable to focus the camera structure, a separate diaphragm control carried by each individual lens mount and movable as a unit with the lens mount along the converging guideways, a common adjusting device on the fixed part of the camera structure, and flexible motion transmitting connections that are disposed between the common adjusting device and the respective diaphragm controls and that transmit corresponding movements to all of the diaphragm controls substantially simultaneously and independently of their positions along the converging guideways.

5. A multi-camera structure for taking mosaic pictures, said structure comprising a plurality of separate lens supports that support lenses with their axes and focal planes in angular relation to one another, forwardly converging guideways, connected with a relatively fixed part of the camera structure, mechanism that moves the lens supports along said guideways to focus the lenses for objects at different distances from the camera structure, separate diaphragm controls on the different lens mounts, each movable as a unit with the lens mount along the guideway, a common adjusting device located on the fixed part of the camera structure, and a flexible motion transmitting element connecting each of the separate diaphragm controls with the adjusting device on the fixed portion of the camera to change all of the diaphragm adjustments equally and simultaneously for all positions of the lens supports along the converging guideways.

6. A multi-camera structure for taking pictures that are to be projected for making a mosaic picture, said structure including a plurality of lens mounts that support lenses with their axes in focal planes in angular relation to one another, forwardly converging guideways connected with a relatively fixed part of the camera structure and on which the lens mounts are movable in the direction of extent of the guideways to focus the lenses, mechanism that moves the lens supports along the guideways, other mechanism that moves at least one of the lens supports transversely of its axes and with respect to the next adjacent lens support to correct for parallax errors induced by the movement of the lens supports to change the focus of the lenses, separate diaphragm controls on the respective lens supports, a common diaphragm adjusting device on the fixed portion of the camera structure, and flexible motion transmitting connections that are disposed between the common adjusting device and the respective diaphragm adjusting devices to move all of the diaphragm adjusting devices simultaneously and independently of their positions along the converging guideways.

7. A multi-camera structure for taking pictures that are to be projected for making a mosaic picture, said structure including a plurality of closely spaced lens mounts that support lenses with their axes and focal planes in angular relation to one another, forwardly converging guideways connected with a relatively fixed part of the camera structure and on which the lens mounts are movable to focus the camera structure, a separate diaphragm control carried by each individual lens mount and comprising two overlapping plates, each having an opening therein overlapping the opening in the other plate, separate blocks connected with the respective plates and movable along adjacent but transversely spaced parallel courses, transversely spaced lead screws extending parallel to one another and each threading through a different one of the respective blocks, and common operating mechanism for both lead screws including motion-transmitting connections that rotate both of the lead screws in unison to move the blocks and their connected plates in opposite directions to vary the degree of overlap of the openings of the plates while maintaining the region of the overlapping openings in a position along the axis of a lens carried by said support.

8. A multi-camera structure for taking mosaic pictures, said structure comprising a plurality of separate lens supports that support lenses with their axes and focal planes in angular relation to one another, each of said lens supports including a continuous sleeve surrounding the lens, forwardly converging guideways connected with a relatively fixed part of the camera structure, mechanism that moves the lens supports along said guideways to focus the lenses for objects at different distances from the camera structure, separate diaphragm controls on the different lens mounts, each movable as a unit with the lens mount along the guideway, and each comprising plates that extend upwardly through slots in the top part of each sleeve and that have overlapping openings therethrough within the sleeve, and mechanism for moving the plates to vary the degree of overlap of the openings, a common adjusting device located on the fixed part of the camera structure, and a flexible motion transmitting element connecting the plate moving mechanism of each of the separate diaphragm controls with the adjusting device on the fixed portion of the camera to change all of the diaphragm adjustments equally and simultaneously for all positions of the lens supports along the converging guideways.

FRED WALLER.
RICHARD C. BABISH.

REFERENCES CITED

The following references are of record in the file of this patent:

UNITED STATES PATENTS

| Number | Name | Date |
| --- | --- | --- |
| 317,788 | Hoover | May 12, 1885 |
| 1,247,682 | Howell | Nov. 27, 1917 |
| 1,300,806 | Akeley | Apr. 15, 1919 |
| 1,366,876 | Colter | Jan. 25, 1921 |
| 1,396,717 | Leonard | Nov. 8, 1921 |
| 1,755,220 | Koehne | Apr. 22, 1930 |
| 1,846,972 | Koppe | Feb. 23, 1932 |
| 2,211,714 | Backman | Aug. 13, 1940 |
| 2,307,479 | Annick | Jan. 5, 1943 |
| 2,402,660 | O'Grady | June 25, 1946 |
| 2,453,075 | Land | Nov. 2, 1948 |